United States Patent
Bentrim

(10) Patent No.: US 7,052,221 B2
(45) Date of Patent: *May 30, 2006

(54) QUICK ACCESS RUBBER PANEL FASTENER

(75) Inventor: Brian G. Bentrim, Hatfield, PA (US)

(73) Assignee: PEM Management, Inc., Wilmington, DE (US)

( * ) Notice: Subject to any disclaimer, the term of this patent is extended or adjusted under 35 U.S.C. 154(b) by 105 days.

This patent is subject to a terminal disclaimer.

(21) Appl. No.: 10/362,098

(22) PCT Filed: Sep. 18, 2001

(86) PCT No.: PCT/US01/28597

§ 371 (c)(1),
(2), (4) Date: Feb. 21, 2003

(87) PCT Pub. No.: WO02/27196

PCT Pub. Date: Apr. 4, 2002

(65) Prior Publication Data

US 2004/0076490 A1 Apr. 22, 2004

Related U.S. Application Data

(60) Provisional application No. 60/234,801, filed on Sep. 25, 2000.

(51) Int. Cl.
  *F16B 21/00* (2006.01)
(52) U.S. Cl. .......................... 411/34; 24/458
(58) Field of Classification Search ............ 411/34–38, 411/354, 907, 908, 55; 24/448
See application file for complete search history.

(56) References Cited

U.S. PATENT DOCUMENTS

| 932,948 | A | * | 8/1909 | Baxter | ..................... 215/359 |
| 2,353,248 | A | | 7/1944 | Lamb | |

(Continued)

FOREIGN PATENT DOCUMENTS

FR 2647163 * 11/1990 .................. 411/34

OTHER PUBLICATIONS

The Paneloc Corporation, BI-FIX Quarter Turn Fastener, pp.: Cover and E-1, Farmington, CT, U.S.A.
Southco, Inc., Southco Quarter-Turn Fasteners, p. 282, Concordville, PA, U.S.A.

*Primary Examiner*—Flemming Saether
(74) *Attorney, Agent, or Firm*—Gregory J. Gore

(57) ABSTRACT

A fastener for attaching two panels and having aligned apertures consists of a fastener which utilizes a retainer, a through-shaft, a rubber sleeve, and an end cap. The shaft extends through the retainer and a rubber sleeve is fitted around the shaft being retained axially by cap which is attached to the end of the shaft. The pre-assembled fastener is attached to a first panel preferably by clinch-type attachment. Cam surfaces on the underside of a head of the shaft and inside the retainer cooperate such that when the head of the shaft is turned, the shaft is withdrawn from the retainer compressing the rubber sleeve between the end cap and a base of the retainer. This causes the rubber sleeve to bulge and apply a clamp load against the backside of the second panel. Thus the two panels are captured between the expanded area of the rubber sleeve and the base of the retainer. A series of radial grooves in the retainer cam ramp act in concert with a protrusion on the underside of the shaft to provide multiple resting points in the rotation. The fastener provides a single, fully-assembled component which works through standard round holes in the panels to provide panel attachment in a variety of panel thicknesses that is also vibration resistant.

13 Claims, 4 Drawing Sheets

U.S. PATENT DOCUMENTS

| | | | |
|---|---|---|---|
| 2,479,862 A * | 8/1949 | Payne | 215/359 |
| 2,513,193 A * | 6/1950 | Miller | 411/34 X |
| 2,688,894 A * | 9/1954 | Modrey | 411/34 |
| 2,904,288 A * | 9/1959 | Krauss et al. | 411/34 X |
| 3,093,220 A * | 6/1963 | Modrey | 411/34 X |
| 3,406,431 A | 10/1968 | Armstrong et al. | |
| 3,673,913 A * | 7/1972 | Barry | 411/34 |
| 3,675,531 A * | 7/1972 | Lehman | 411/34 |
| 4,236,429 A | 12/1980 | Dolch | |
| 4,331,413 A * | 5/1982 | Hoen | 411/44 |
| 4,405,272 A | 9/1983 | Wollar | |
| 5,028,187 A | 7/1991 | Sato | |
| 5,184,698 A * | 2/1993 | Coffenberry | 411/34 X |
| 5,228,815 A | 7/1993 | Gignac et al. | |
| 5,286,152 A | 2/1994 | Anderson | |
| 6,039,523 A | 3/2000 | Kraus | |
| 6,868,590 B1 * | 3/2005 | Bentrim | 24/458 |

\* cited by examiner

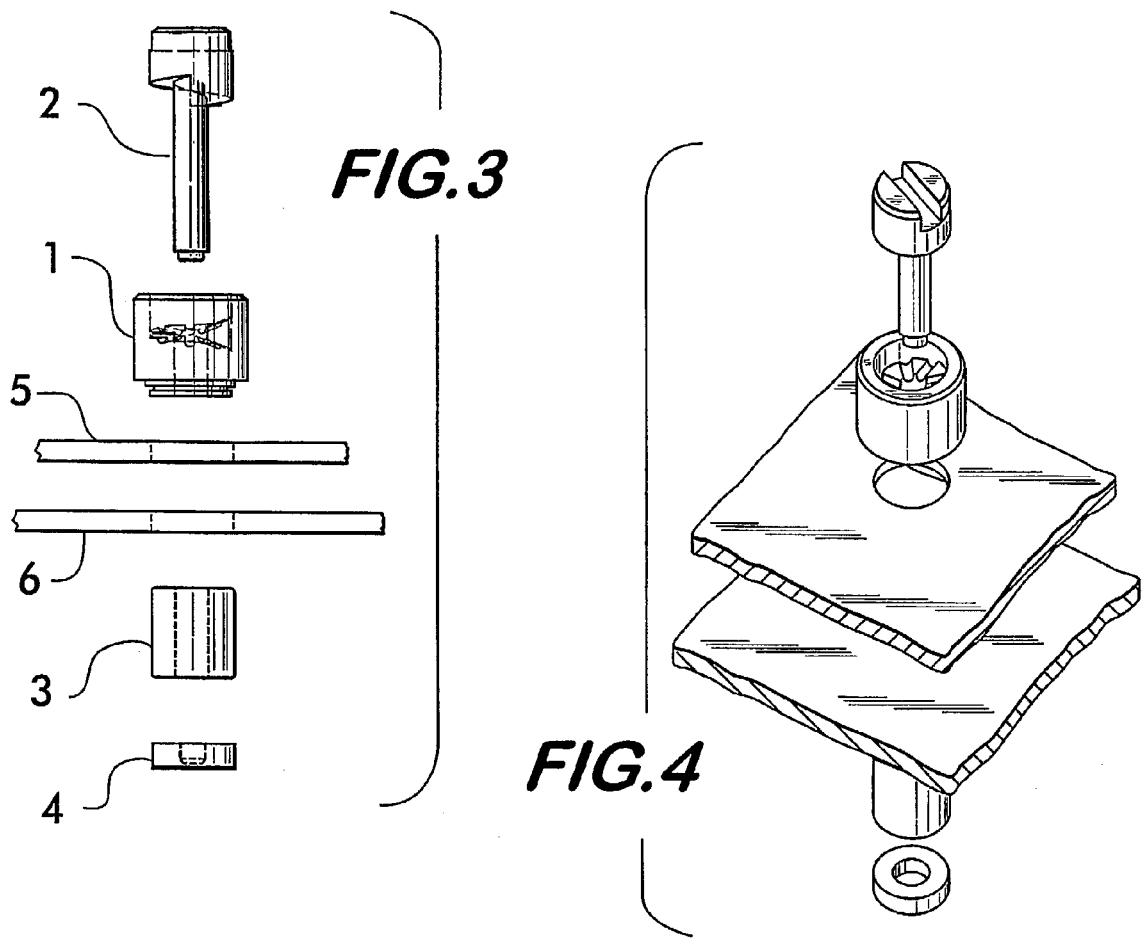
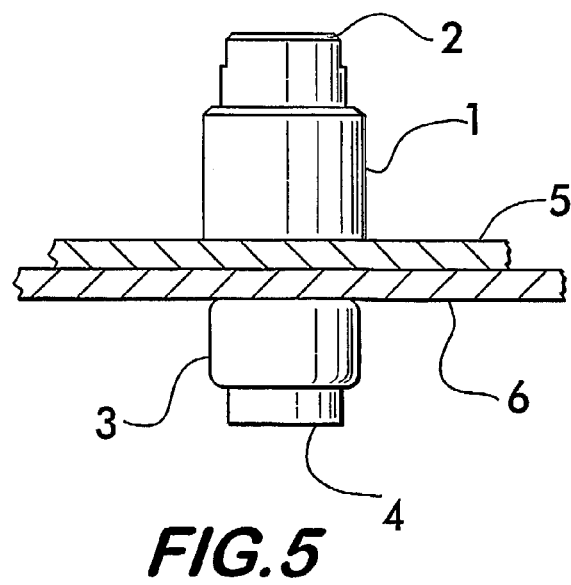

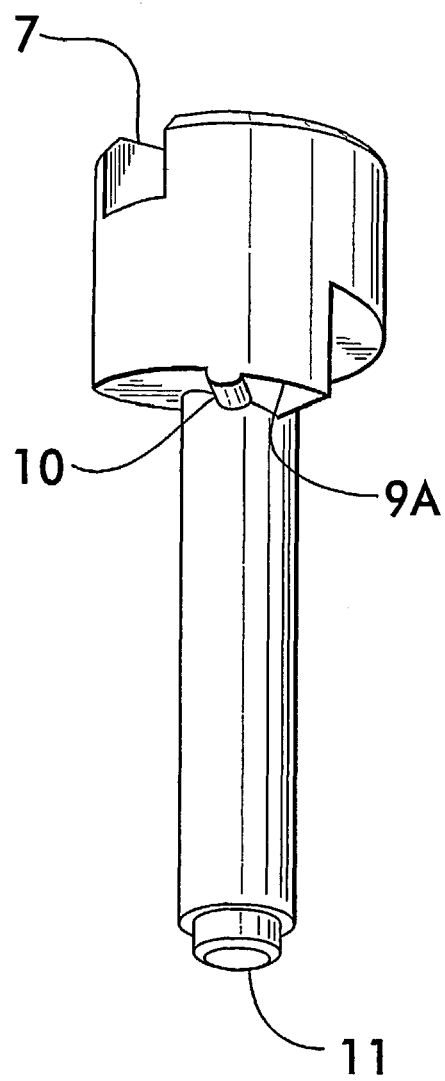
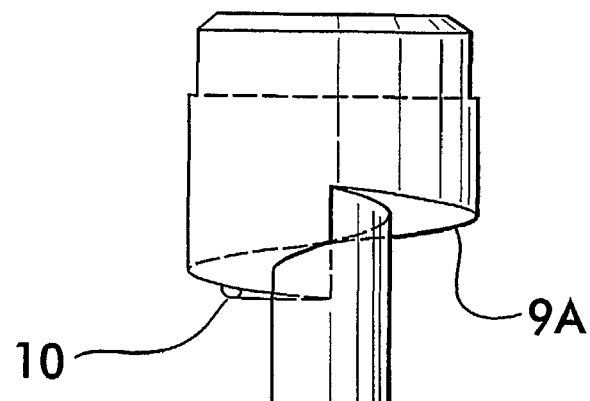

QUICK ACCESS RUBBER PANEL FASTENER

This application claims the benefit of provisional application Ser. No. 60/234,801, filed Sep. 25, 2000.

FIELD OF THE INVENTION

This invention relates to a fastener which enables two panels or boards to be quickly attached or disengaged. More specifically, it relates to a fastener that provides a clamp load through the axial compression and subsequent diametric expansion of a rubber sleeve with actuation which is achieved by rotating a central shaft less than 360 degrees.

BACKGROUND OF THE INVENTION

There has long been a demand in the art for a quick access panel fastener. Quick access panel fasteners provide a fastening system to securely join two panels parallel to each other in a way that can be quickly and easily joined and later detached. A clamp load is also very desirable. There are many variations of fasteners that are designed to achieve that general objective. Each has specific limitations including: cost, scope of applications, and lack of clamp load. Some require that a second component be affixed to the mating panel by the end user or that multiple pieces initially must be assembled. There is a need for a quick access panel fastener, that provides a clamp load at low cost in an easy-to-use single component. Several types of quick-access fasteners have been developed, none of which incorporate all of the desirable attributes.

The Camloc company offers fasteners that are sold as a single component, however they require the fastener mounting holes in both panels to have an odd shape that can not be drilled and can only be punched with multiple hits or with a special punch. The fastener then must be aligned prior to insertion into the panels and is then turned to hold the panels together.

The Southco® company offers a Series 20 and 50 "Fractional-turn Fastener" which uses a rubber sleeve with two cams and a stud. This fastener also has the significant drawback of the other style fasteners; namely, it must be assembled by the end user.

The Paneloc Company offers their BI-FIX quarter-turn fastener which includes five components some of which are application specific to produce a vibration resistant reusable fastener. It also requires a myriad of different components that are needed to make the fastener work in different applications.

The DZUS Company also offers a five component fastener in their Standard Line of quarter-turn fasteners which includes a stud and a grommet that attaches to the first panel, and a spring with two rivets that attaches to the second panel. DZUS offers several other variations, but each includes multiple, unassembled components.

While there are many variations of quick-access or quarter-turn fasteners available that solve a myriad of problems, each variant has associated with it a number of drawbacks. The present invention comes as a pre-assembled, single piece fastener which can be rigidly attached to the first panel by well known methods including clinching, flaring, and the like. For this reason, it is excellent from a DFMA (Design For Manufacturing and Assembly) standpoint. Thus, the present invention solves many problems unaddressed by the prior art.

SUMMARY OF THE INVENTION

In order to address the problems of the prior art, the present invention consists of a fastener which incorporates a top side retainer, a through shaft, a rubber sleeve, and an end cap. The retainer includes a radially disposed cam ramp that cooperates with a mating cam ramp on the underside of the head of a shaft. A clamp shaft extends through the retainer and a rubber sleeve is fitted around the clamp shaft which is retained axially by a cap which is attached to the end of the shaft. The fastener assembly, consisting of the shaft, retainer, rubber sleeve and end cap, is attached to a first panel preferably by a clinch type attachment, with the rubber sleeve extending through the second panel. When the head of the shaft is turned by a tool, the cam-action between the head and the retainer withdraws the shaft axially from the retainer, compressing the rubber sleeve between the end cap and the base of the retainer. The rubber sleeve bulges under compression and thereby applies a clamp load against the backside of the second panel. Thus, the two panels are captured between the expanded area of the rubber sleeve and the base of the retainer. During the rotation of the shaft, a series of radial grooves in the retainer cam ramp act in concert with a single radial protrusion on the underside of the mating cam ramp of the shaft and provide multiple detents or resting points in the rotation. The use of multiple detents allows for additional panel thickness variation and greatly improves its performance by controlling the amount of clamp force.

The present invention provides many advantages over the prior art. It provides a clamp load in a variety of sheet thicknesses. Furthermore: it is inexpensive, it is a single fully-assembled component, it works with a standard round hole, it can be permanently affixed to a panel, and it is vibration resistant.

BRIEF DESCRIPTION OF THE DRAWINGS

FIG. 3 is an assembly view showing various parts of the present invention installed into two panels.

FIG. 4 is a top, right front isometric assembly view of the present invention installed into two panels.

FIG. 5 is a side view of the present invention tightened down applying a clamp load to the panels.

FIG. 6 is a bottom, right rear isometric view of the shaft element of the present invention.

FIG. 7 is a front view of the shaft element of the present invention.

DESCRIPTION OF THE PREFERRED EMBODIMENT

Figure 1:
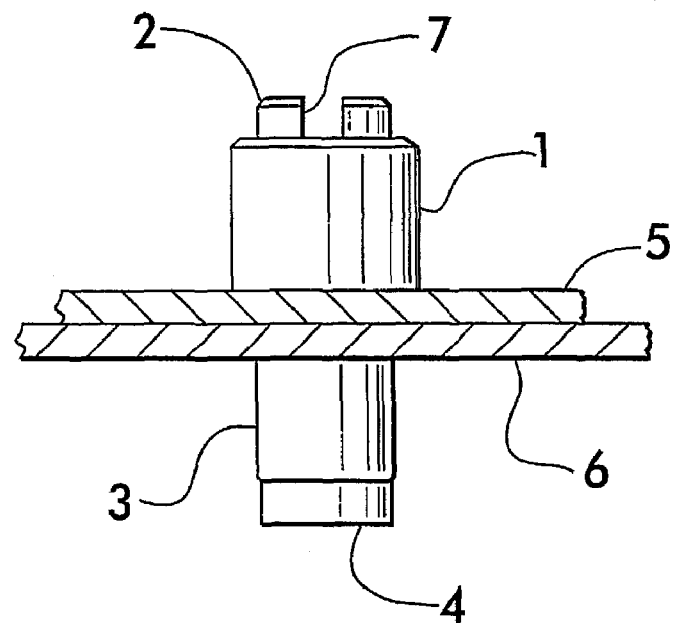
FIG. 1 is a side view of the present invention holding two panels together.
Figure 2:
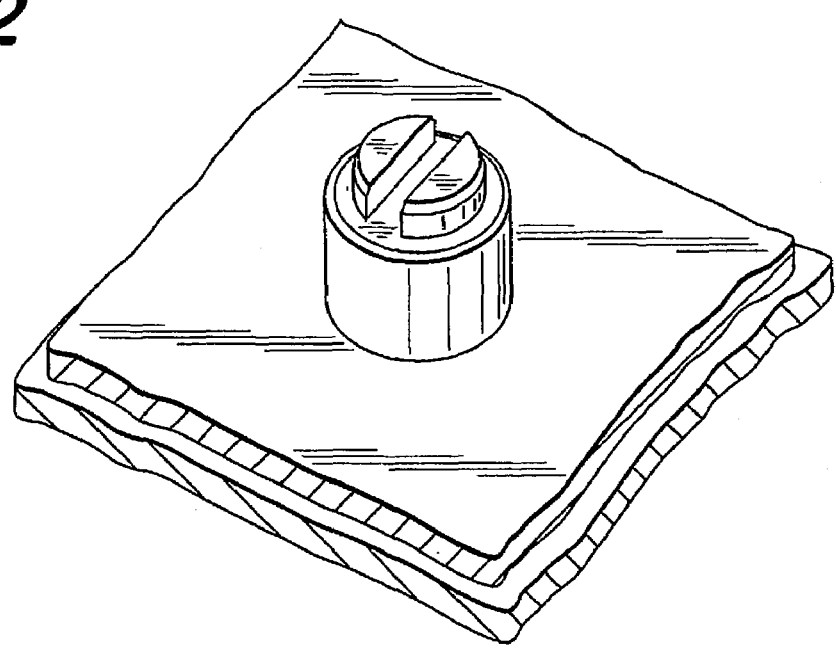
FIG. 2 is a top, left isometric view of the assembled invention shown in FIG. 1.

FIGS. 1 and 2 show the panels in a unfastened condition with panel 5 located in position against the base of the retainer 1. The shaft is seated at the lowest possible point in the retainer 1, allowing the rubber sleeve 3 to be in a relaxed, unstressed state. The pre-assembled fastener may be permanently attached to the top panel 5 through means of a clinch, adhesive or another similar method such as clinch 8 shown in FIG. 9. The bottom panel 6 is loose and in this state the fastener and top panel could be freely removed away from the bottom panel 6. The round hole is the only feature required on the bottom panel 6. The shaft includes an actuation device, shown as slot 7, but could it be a hex (internal or external) wing, knurl, handle or another similar drive feature.

As the shaft is turned, the underside of the head forces the shaft outward from a mouth of the retainer do to the camming action of the cooperating ramps on the underside of the head and the inside of the retainer. This causes the rubber sleeve 3 to be compressed between the end cap and the base of the retainer, thus expanding its diameter and forcing the expanded area against the backside of the second panel. In this manner a clamp load is achieved as shown in FIG. 5. The end cap 4 that holds the rubber sleeve 3 in place may be attached to the shaft 2 by a variety of means. Shown is a press fit 11 which simply provides an interference fit with a property sized hole in the end cap 4.

Referring now to FIGS. 3 and 4, the present fastener is a four-piece assembly comprised of the retainer 1, the shaft 2, the rubber sleeve 3 and the end cap 4. The shaft 2 seats in the retainer 1 so that turning the shaft 2 ramps it upwards on the retainer 1. The rubber sleeve 3 sits on the shaft 2 and is held in place by the end cap 4. The end cap 4 is permanently attached to the shaft 2 through a clinch, press fit, or another similar method.

Referring now to FIGS. 6 and 7, the shaft element of the present invention is shown in isolation. The shaft includes a barrel-shaped head having drive means 7. The underside of the head includes a cam ramp 9a that includes a detent 10 which protrudes from the ramp. At the end of the shaft is a press fit stub 11. FIG. 7 shows the same elements but from a side view perspective.

Figure 8:
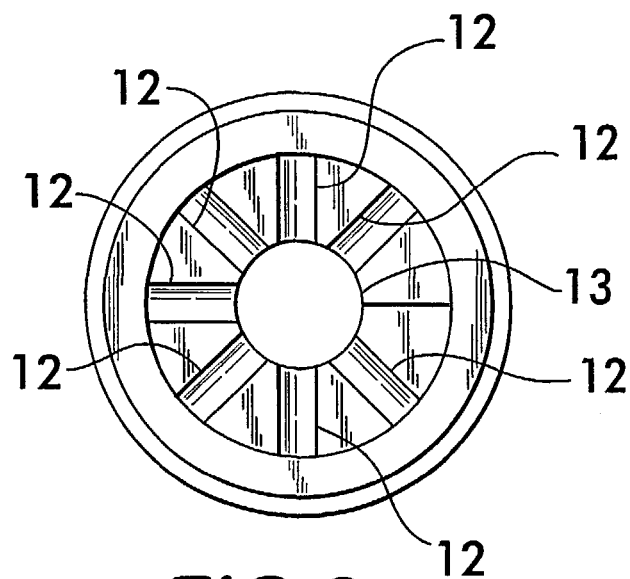
FIG. 8 is a top view of the retainer element of the present invention.
Figure 10:
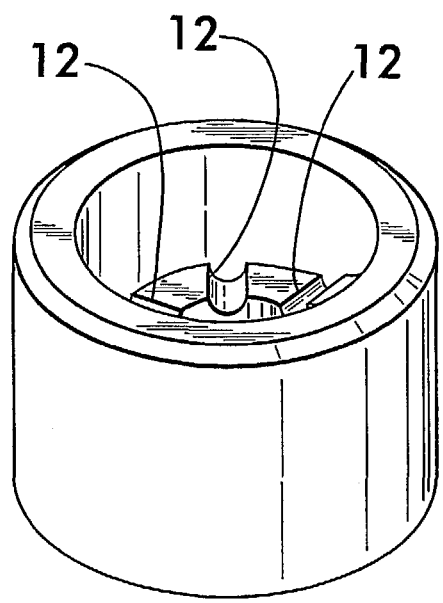
FIG. 10 is a top, right isometric view of the retainer portion of the present invention.
Figure 9:
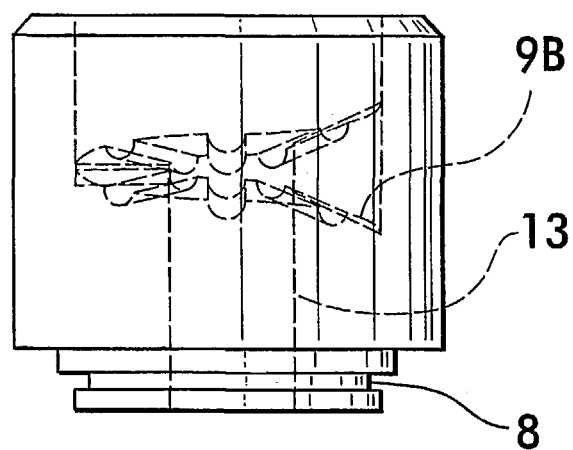
FIG. 9 is a side view of the retainer portion of the present invention.

FIGS. 8, 9 and 10 all detail the retainer component. FIG. 8 shows the retainer 1 from the top. The series of grooves 12 can be seen radiating outward from the through hole 13. The grooves 12 are arranged on the ramp 9b of the retainer 1 so that they hold the detent (element 10 of FIGS. 6 and 7) while the rubber sleeve 3 is compressed. FIG. 9 is a side view that again shows how the grooves 12 are arranged on the ramp 9b. It also shows a clinch 8, which is the preferred means to permanently attach the fastener to the top panel.

Thus, the objects of the present invention have been achieved. The fastener disclosed herein is sold as a single, fully assembled part that is easy to use, requiring no assembly. Furthermore, the fastener can be permanently affixed to a panel so that there are no loose parts in either the locked or unlocked state and it installs into two, easily-formed round holes with no special tooling required to prepare the holes. The holes are simply punched or drilled quickly and with standard tooling. Because the rubber is in compression while in use, the fastener will always generate a clamp load. Also, the amount of final clamp load is adjustable by how far the shaft is turned.

It should be understood that there may be other modifications and changes to the present invention that will be obvious to those of skill in the art from the foregoing description, however, the present invention should be limited only by the following claims and their legal equivalents.

What is claimed is:

1. A fastener for attaching two panels having aligned apertures, comprising:
    an elongate retainer having a longitudinal axial bore, a base at one end, and a mouth at an opposite end;
    an attachment means for rigidly affixing the retainer to a first panel;
    a first cam integral with said retainer, said cam radially disposed around the mouth of said retainer and extending longitudinally therefrom;
    a shaft having a head at one end, said shaft extending through said bore and beyond the base of said retainer;
    a second cam in frictional engagement with said first cam, said second cam extending longitudinally from an underside of said head of said shaft;
    an elastomeric sleeve located around a portion of said shaft which extends beyond the base of said retainer, said sleeve having an outside diameter greater than said bore and being in axial abutment with said base; and
    a cap affixed to a second end of said shaft, said cap being in abutment with the sleeve whereby rotation of said shaft causes retraction of said shaft from the mouth of the retainer and bulging of said elastomeric sleeve such that when said fastener is installed through aligned apertures in the first panel and a second panel, a bulge created by turning the shaft applies an axial clamp force against an opposite side of the second panel.

2. The fastener of claim 1 wherein said first cam includes a plurality of radially-extending grooves and said second cam includes a longitudinally protruding detent whereby said pin is selectively held at different positions when said detent lies within a groove.

3. The fastener of claim 1 wherein said retainer base attachment means affixes said fastener to the periphery of an aperture in the first panel.

4. The fastener of claim 3 wherein said retainer attachment means are clinch structures which receive the deformation of material from the first panel.

5. The fastener of claim 1 wherein said elastomeric sleeve is composed of rubber.

6. The fastener of claim 1 further including tool engagement means on the head of said shaft.

7. An assembly of parts, comprising:
    a first panel in face-to-face abutment with a second panel, each panel including at least one aperture aligned with at least one aperture of the other panel.
    a fastener installed through said aligned apertures in both panels forceably clamping said two panels together, said fastener comprising:
        an elongate retainer having a longitudinal axial bore, a base atone end, and a mouth at an opposite end;
        a first cam integral with said retainer, said cam radially disposed around the mouth of said retainer and extending longitudinally therefrom;
        a shaft having a head at one end, said shaft extending through said bore and beyond the base of said retainer;
        a second cam in frictional engagement with said first cam, said second cam extending longitudinally from an underside of said head of said pin;
        an elastomeric sleeve located around a portion of said shaft which extends beyond the base of said retainer, said sleeve having an outside diameter greater than said bore and being at axial abutment with said base; and
        a cap affixed to a second end of said pin, said cap being in abutment with the sleeve whereby rotation of said shaft causes the retraction of said shaft from the mouth of the retainer and bulging of said elastomeric sleeve such that when said fastener is installed through aligned apertures in a first panel and a second panel, a bulge created by turning the shaft applies an axial clamp force against an opposite side of the second panel.

8. The assembly of claim 7 wherein said first cam includes a plurality of radially-extending grooves and said second cam includes a longitudinally protruding detent whereby said shaft is selectively held at different positions when said detent lies within a groove.

9. The assembly of claim 7 wherein said retainer base attachment means affixes said fastener to the periphery of the aperture in the first panel.

10. The assembly of claim 9 wherein said retainer attachment means are clinch structures which receive the deformation of material from the first panel.

11. The assembly of claim 10 wherein said panels are composed of metal.

12. The assembly of claim 7 wherein said elastomeric sleeve is composed of rubber.

13. The assembly of claim 7 wherein said base further includes attachment means for fastening the retainer to the first panel.

* * * * *